United States Patent

[11] 3,574,878

[72] Inventors Harold Shames
Ardsley;
Sidney J. Shames, Briarcliff Manor, N.Y.;
John F. Logan, Pequannock, N.J.
[21] Appl. No. 825,829
[22] Filed May 19, 1969
[45] Patented Apr. 13, 1971
[73] Assignee said Logan assor. to Melard Manufacturing Corp.
Bronx, N.Y.

[54] POWER ROOTER WITH SAFETY CLUTCH
2 Claims, 4 Drawing Figs.
[52] U.S. Cl. .................................................. 15/104.3,
15/104.1, 64/29
[51] Int. Cl. ................................................... B08b 9/02
[50] Field of Search ........................................... 15/104.3
(SN), 104.3, 104.1, 104.11; 64/1—4, 29

[56] References Cited
UNITED STATES PATENTS
| | | | |
|---|---|---|---|
| 636,417 | 11/1899 | Smith ........................... | 64/2X |
| 2,169,543 | 8/1939 | Sullivan ........................ | 15/104.3(Sn)X |
| 2,401,992 | 6/1946 | Waller ........................... | 64/29X |
| 3,283,353 | 11/1966 | Kirk .............................. | 15/104.3Sn |

FOREIGN PATENTS
| | | | |
|---|---|---|---|
| 1,166,284 | 11/1958 | France ......................... | 64/29 |
| 307,996 | 5/1933 | Italy ............................. | 15/104.3(Sn) |

*Primary Examiner*—Edward L. Roberts
*Attorney*—Bair, Freeman and Molinare

ABSTRACT: A helical-wire power-driven snake is provided at its drive end with a torque-responsive safety clutch which prevents kinking or snapping of the wire or overloading or burnout of the source of rotary power. Spring-loaded clutch elements cooperating with axial grooves provide for both transmission of rotary motion and selective transmission of thrust from the power tool.

Patented April 13, 1971
3,574,878
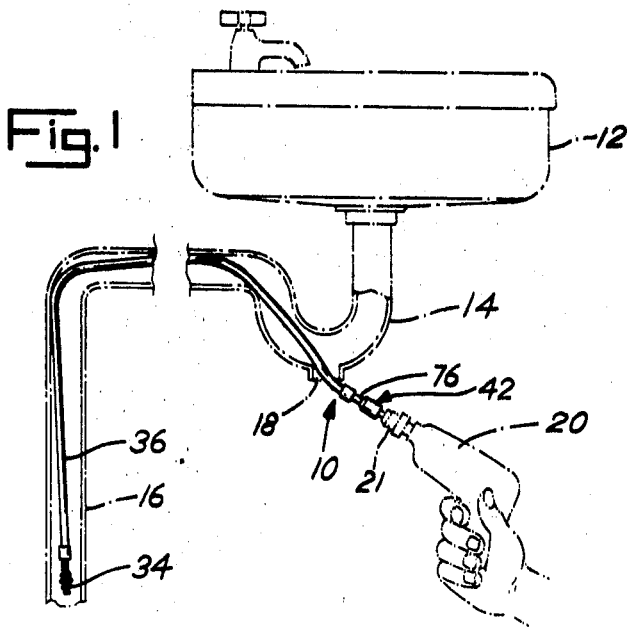
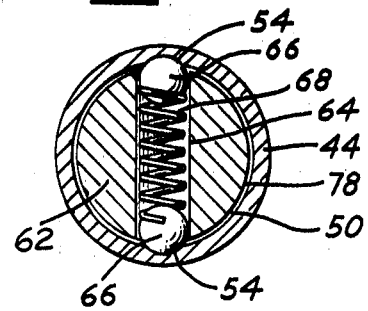
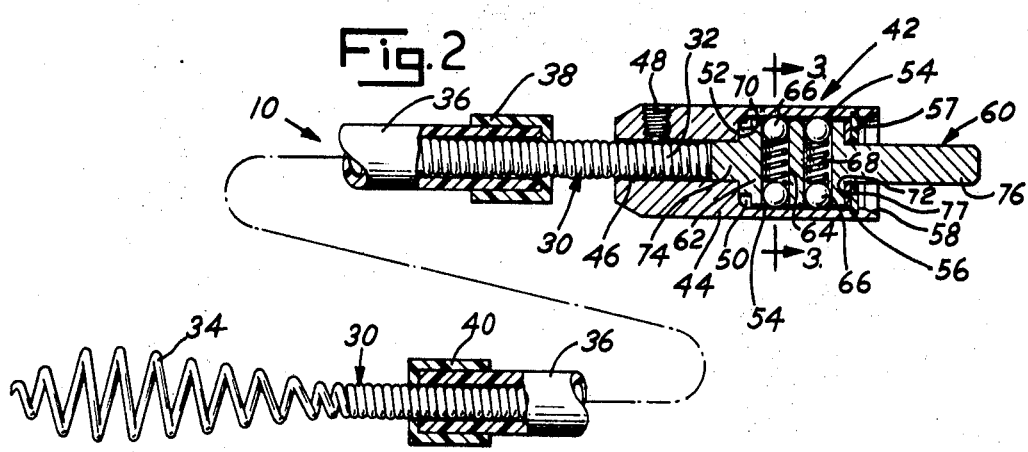
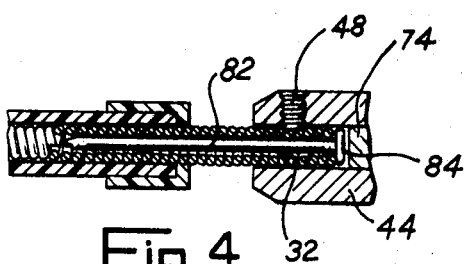
INVENTORS
HAROLD SHAMES,
SIDNEY J. SHAMES
BY & JOHN F. LOGAN
Bair, Freeman & Molinare
ATTORNEYS

POWER ROOTER WITH SAFETY CLUTCH

BACKGROUND OF THE INVENTION

This invention relates to an improved helical wire-type power-driven snake, or sewer or drain-cleaning tool, and more particularly to a power snake provided with safety clutch means that prevent damage to the snake or to the power tool used for actuating the snake.

The general concept of a power-driven snake for cleaning out clogged drains or sewer pipes is old and well known and has been used for years by plumbers. It has been suggested that widespread availability of hand-held electric motors for tools, such as drills, would permit a homeowner or tenant to use such a device with an elongated helical wire, or snake, for cleaning out clogged drains or pipes without need of calling on an expert plumber for assistance. However, inexpert use of such a connection of tools may result, when serious obstructions are encountered, in damage to the helical wire or to the electric motor or to both.

Accordingly, it is the object of this invention to provide a power-driven snake with a simple, effective, and inexpensive safety clutch means that prevents damage to either the snake or to a hand-held power tool that is used with the snake.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing.

BRIEF DESCRIPTION OF THE DRAWING

FIG. 1 illustrates a typical usage of the device of this invention;

FIG. 2 is a fragmentary longitudinal axial cross-sectional view of the ends of the snake showing one form of safety clutch for use with the snake;

FIG. 3 is an enlarged cross-sectional view taken on line 3–3 of FIG. 2; and

FIG. 4 is a fragmentary view similar to a portion of FIG. 2 and showing a modified form of construction of a portion of the safety clutch.

DESCRIPTION OF THE PREFERRED EMBODIMENTS

Referring now to the drawings, FIG. 1 illustrates the power snake with safety clutch, generally at 10, in an instance of typical intended usage. The environment of such usage includes a sink 12 having a typical trap 14 which discharges to a drain pipe 16, and a service aperture 18 opening at the underside of the trap 14. The power snake is shown entering trap 14 through aperture 18 and with the extended end of the snake in drain pipe 16. The power snake 10 is being actuated by an electric hand drill 20 of the type that is normally provided with a split-jaw-type clutch 21 for gripping the elongated shank of a member such as a drill bit.

Referring to the snake itself, the snake comprises an elongated member 30 defined by a tightly wound helical wire having a drive end 32 and a driven end 34, with the driven end 34 shaped to provide an enlarged head with the loops of the wire helix spaced axially, as shown in FIG. 2, so as to give an auger effect as is well known in the art.

In the specific snake 10 of this invention, the greater portion of the length of wire member 30 extends through a flexible tube, or sleeve, 36 of a plastic material, preferably polyethylene. The tube 36 has its ends capped at 38 and 40 with cup-shaped bushings of acetal plastic that are frictionally retained on tube 36 and which act as thrust bearings and also prevent the fraying of the ends of the tube 36. The plastic tube and the acetal bushings 38 and 40 operate to protect the helical wire member 30. The combination also enables easier insertion of the power snake into the drain line, as illustrated in FIG. 1, and facilitates high-speed rotation of the snake.

The snake's drive end 32 which is spaced from tube 36 is shown connected to a clutch generally indicated at 42. Clutch 42 includes an elongated, tubular driven member 44 which provides at one end for connection to member 30 by means of an axially extending bore 46 of reduced diameter for just slidably receiving therein the snake's drive end 32. A setscrew 48 is adapted to extend into the reduced bore 46 to engage and drivingly clamp the end 32 of member 30. The other end of driven member 44 is provided with an enlarged bore 50 that is bounded at its inner end by an annular seat 52. Two elongated, axially extending grooves 54 are provided diametrically in the inner wall portion which surrounds bore 50. Adjacent the entrance end to bore 50, and distally of the annular seat 52, there is provided an undercut groove 56 adapted to receive a snapring retainer 57, and outwardly of the undercut groove there is a beveled inner surface 58.

The clutch 42 includes a drive member 60 that has a radially enlarged body 62 with at least one transverse diametric bore 64 therethrough. As shown, two such bores 64 are provided. Each of the bores carries therein two spaced balls 66 that are normally biased outwardly by a central spring 68. The axial ends of the enlarged body 62 define spaced annular abutments 70 and 72. Adjacent the abutment 70 there is a reduced diameter stud 74 for entry into the reduced diameter bore 46. Adjacent the annular abutment 72 there is an axially elongated shank 76 which is adapted to be gripped by the jaws of the clutch 21 provided on the hand electric motor, as shown in FIG. 1. When the annular abutment 70 engages the annular shoulder 52, as seen in FIG. 2, and with the snapring 57 in the undercut groove 56 for retaining the parts in assembled condition, there exists a slight spacing 77 between the annular abutment 72 and the adjacent snapring 57. The dimension of body 62 is such that there is a slight spacing 78 between the outer surface thereof and the inner surface of enlarged bore 50, as can best be seen in FIG. 3.

From the foregoing the operation of the device will be readily understood. The clutch 42 operates to limit the torque transmitted between the electric hand drill 20 and the helical wire member 30. The clutch 42 is of the ball-detent type which disconnects the driver 60 from the driven part 44 at a predetermined torque, thus preventing burnout of the drill 20 or breakage or kinking of the member 30. The ball-detent means includes at least one spring-loaded ball 66 carried by the driver member 60 and arranged to enter a groove 54 in the driven member 44. In actual practice four such spring-loaded balls are used, and two balls enter each of two diametrically located grooves. These balls transmit the power from the drive member 60 to the tubular driven member 44 and from there to the snake 30. If the torque limit is reached, the increased radial load on the balls 66 operates to compress the springs 68, thus effecting disconnection of the driving and driven members and then permitting rotation of the drive member 60 within the driven member 44. Upon pressing the electric hand drill 20 forwardly, the abutment wall 70 engages the annular seal 52 to transmit axial thrust to the snake 10, and the axially elongated grooves 54 permit of such axial movement of the balls 66 relative to the driven member 44.

In the modified form of construction shown in FIG. 4, in order to obtain greater gripping pressure between the setscrew 48 and the drive end 32 of the snake member 30, there is provided a core member, in the form of a headed pin, for rigidifying end 32 of the snake. This core member provides an elongated shank 82 that enters through the open end of the helical wire member 30. The head 84 engages the end of member 30 to limit movement in one direction, and when assembled with the clutch 42, the stud 74 prevents movement of the head 84 in the opposite direction.

While there has been shown and described a particular embodiment of this invention, and particularly one form of spring-loaded clutch, it will be obvious to those skilled in the art that various changes and modifications may be made therein without departing from the invention, such as using roller-type members or other mechanical equivalents rather than balls in the clutch and, therefore, it is intended in the appended claims to cover all such changes and modifications as fall within the true spirit and scope of the invention.

We claim:

1. In a power-driven flexible snake, the combination comprising: elongated flexible tube means with an elongated flexible helical wire member extending therethrough and providing drive and driven ends extending outwardly of the ends of the tube means, clutch means including a tubular driven member with gripping means thereon for selective driving securement of the tubular member to the drive end of the helical wire member, said clutch means including a driver that is separate from said driven member and which provides a shank adapted to be selectively gripped by a rotary power tool, spring-loaded clutch means drivingly interconnecting the driver and driven member and adapted to disengage the driver from the driven member upon development of an overload condition on the helical wire member, the spring-loaded clutch means including at least one axial groove in the tubular driven member, at least one ball member carried by the driver and arranged to move transversely of the groove between an operative position in the groove and a release position out of the groove, there being abutment elements on the driver and driven member through which axial thrust may be selectively transmitted, and the ball being movable axially in said axial groove as the abutment elements are selectively moved toward and away from each other.

2. In a power-driven flexible snake, the combination comprising: elongated flexible tube means with an elongated flexible helical wire member extending therethrough and providing drive and driven ends extending outwardly of the ends of the tube means, clutch means including a tubular driven member with gripping means thereon for selective driving securement of the tubular member to the drive end of the helical wire member, such clutch means including a driver that is separate from said driven member and which provides a shank adapted to be selectively gripped by a rotary power tool, spring-loaded clutch means drivingly interconnecting the driver and driven member and adapted to disengage the driver from the driven member upon development of an overload condition on the helical wire member, the gripping means for securement of the driven member to the helical wire member including a rigid core member which is arranged to axially enter the open end of the helical wire, and a screw member carried by the driven member and spaced from but movable transversely to said core member to clamp the helical wire member against the core member.